April 4, 1939. J. N. ICE 2,152,962
SELF-THREADING COUPLING UNIT
Filed Nov. 23, 1937
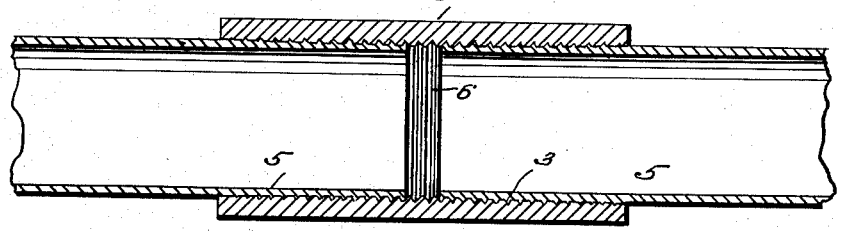
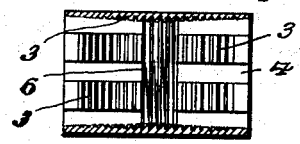 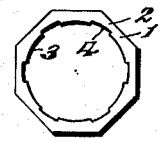
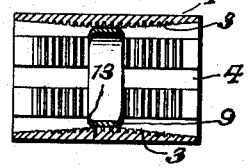 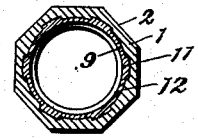
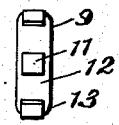 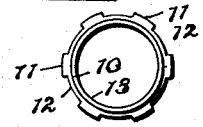
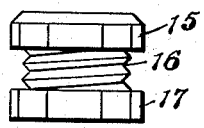 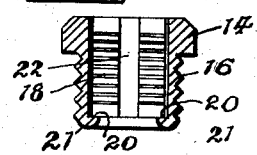
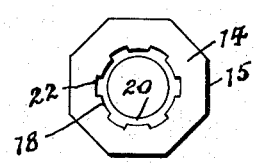 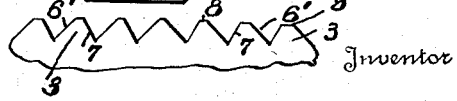
Inventor
James N. Ice
By
Attorney Patented Apr. 4, 1939

2,152,962

UNITED STATES PATENT OFFICE 2,152,962

SELF-THREADING COUPLING UNIT

James N. Ice, Wheeling, W. Va., assignor to Paul H. Michel, Wheeling, W. Va.

Application November 23, 1937, Serial No. 176,137

3 Claims. (Cl. 285—145)

This invention is directed to couplings designed especially for use in connection with thin walled piping and particularly the thin walled conduits required for electric wiring and the thin walled copper pipe or tubing which is being rapidly adopted as standard.

The authorities now require that in electrical installation the wires be carried in metal conduits in the form of pipe-like structure and in connection with such requirement, a very serious difficulty has arisen in connecting the meeting ends of the conduit sections. The connectors must present a rigid joint absolutely sealed against the admission of water and when it is taken into consideration that these conduits are and must necessarily be of thin wall, seldom if ever reaching a thickness of one-sixteenth of an inch, the practical impossibility of threading the meeting ends of these conduits in the usual way and applying a connector of conventional form thereto will be at once appreciated because the thickness of the wall precludes the formation of conventional threads without extreme liability of cutting through the conduit or so weakening it that the subsequent application of the coupling is not only of little rigidity but, more importantly, open to leakage from without, with a resultant joint which would not pass inspection.

The difficulties in providing this type of joint as heretofore proposed have been so pronounced that such joint has been practically discarded and the coupling made by sweating or otherwise uniting the coupling to the conduit ends, with the result of materially increasing the time and labor required for the installation and thereby materially increasing its initial cost. Of course, it will be appreciated that the threaded type of union is economical from the time and labor saving standpoint as well as the cost of material and presents the ideal joint for this type of work if the objections can be satisfactorily overcome.

The primary object of the present invention, therefore, is the provision of a coupling particularly designed for electrical conduits, which, in its initial application to the end of one section, is self-threading with respect to the section, is provided with a particular type of thread which will not cause severe weakening or cutting through the conduit, and which, when applied incident to its self-threading operation, remains without adjustment or change to insure an intimate sealing relation with the conduit. The coupling so provided is, of course, double-ended, with one end adapted to be applied to one end of the conduit and self-threading the conduit during such application, and the other end to receive the mating end of the next section of conduit which is self-threaded as it is applied to the coupling.

The invention is further designed as a coupling for the meeting ends of copper pipe or tubing which is being universally adopted for water and like purposes incident to its resistance to rust or corrosion and, therefore, of much longer life than the conventional piping employed for this purpose. This copper tubing or pipe is also of thin walled production primarily incident to a saving in cost of a heavy walled production and the further fact that the inherent resistance of the material of the copper tubing or pipe renders the heavy walled production unnecessary. The coupling for this purpose is identical in all respects to the coupling for electrical conduits, varying only in diameter, and with the further provision of an element which completely seals the meeting ends of the copper tubing or pipe against possible leakage and at the same time seals the thread-interrupted spaces in the coupling ordinarily provided for the reception of the cuttings of the thread cutters.

A further object of the invention is to adapt the principles of the coupling to the thimble used for connecting the end of the electrical conduit to the junction box, the thimble having the self-threading characteristics so that it may be applied to the end of the conduit and cut the necessary threads on the conduit as the coupling is advanced to maintain a rigid connection between the thimble and conduit without liability of cutting through the conduit; and an essential feature of the thimble is the provision of means whereby ⁓ self-threading movement of the thiml ⌐ the conduit is limited to prevent the free e₁ of the conduit from projecting beyond the free end of the thimble under possible careless or hurried operation, this limiting of the conduit in its movement through the thimble preventing the free end of the conduit, which usually presents sharp edges incident to its cutting into the required length, from projecting beyond the free end of the thimble and thus possibly wearing away the insulation of the wires which project beyond this free end when the thimble is connected in the junction box. To this end and for this purpose, the free end of the thimble is also rounded, presenting a smooth surface which, if contacted by the wire, avoids any possibility of injuring the insulation.

A further object of the invention is the provision of a coupling, either as a unit for the meeting ends of the sections or as a thimble, in which the thread-cutting elements have a leading edge of greater inclination than the trailing edge and in which the apexes of the cutting elements are slightly flattened to prevent possibility of cutting through the wall of the conduit or pipe.

A further object of the invention is the provision of a coupling formed with longitudinally ranging thread-cutting lengths and intermediate channels to receive the cuttings, with the central portion of the coupling integrally formed with a completely annular interior area which interrupts or eliminates the channel portions and thus prevents the possibility of any seepage of water entering the ends of the conduits.

A further object of the invention is the provision of an independent washer which may be applied to a coupling in which the channels between the thread-cutting areas extend throughout the length of the coupling, with said washer provided with projections fitting the channels and forced under pressure longitudinally of the coupling to approximately a central point to thus seal the channel portions against the possibility of the entrance of water and absolutely prevent such water from reaching the meeting ends of the conduits. The use of this independent element, where the coupling is to be used for connecting copper water or like tubing or pipes, provides an effective seal against leakage from the tubing or pipes and in this use the ends of this independent element are preferably directed inwardly to cause a flaring of the adjacent ends of the copper tubing or pipes as the coupling is applied, thus further sealing the ends of the tubing or pipes and insuring a continuation of the water passage between such adjacent ends of the tubing or pipes.

The invention is illustrated in the accompanying drawing, in which:

Figure 1 is a view in section showing the coupling applied to the meeting ends of electrical conduits, the ends of the conduits being shown slightly spaced from their final position to illustrate the intermediate uninterrupted threaded section of the coupling.

Figure 2 is a vertical section of the coupling unit.

Figure 3 is an end view of the same.

Figure 4 is a section of the unit showing the intermediate independent member applied for the purpose of preventing leakage, the showing illustrating the independent member as used for connecting copper tubing or pipes.

Figure 5 is a transverse section through the coupling with the independent unit in position.

Figure 6 is an edge view of the unit.

Figure 7 is an elevation of the unit.

Figure 8 is an elevation of the junction box connecting thimble.

Figure 9 is a vertical sectional view of the same.

Figure 10 is a top plan view.

Figure 11 is an enlarged sectional view showing the formation of the cutting teeth employed in the coupling.

The coupling unit 1 is a tubular body exteriorly formed as angularly related faces 2 to provide for the application of a wrench. The coupling is interiorly formed with a series of rows of thread-cutting teeth 3, which will be hereinafter more particularly described, the rows of teeth being interspersed with plain channels 4 formed by broaching the tube in the usual manner. The coupling unit is designed for application to electric conduits, indicated at 5, or to copper tubing and pipe, the essential characteristic of which is that the walls are very thin as compared with the usual piping. The unit is designed to be self-threading in that it cuts the threads on the meeting ends of the tubing or conduit and for this purpose, the thread cutters are of minute depth at the entrant ends of the coupling and gradually increase in depth toward the center of the coupling.

In the form shown in Figures 1 and 2, the central portion of the inner surface of the unit, instead of being formed with the particular row of thread cutters and the intervening plain channels, is formed with a threaded area 6 which extends uninterruptedly throughout the full interior annular surface of the unit. The threaded portion 6, which will be hereinafter termed the sealing portion, is thus formed of uninterrupted threads which, of course, provide a continuation of the thread formation of the thread cutters 3.

More importantly, however, this intermediate sealing portion serves to interrupt or eliminate the channels 4, so that when the ends of the tubing 5 meet at the central portion of the coupling unit, the threaded portion 6 forms a complete seal for the ends of the conduit or tubing and thus prevents any possibility of seepage into such conduit which might otherwise reach the interior of the conduit or tubing through the channels 4. Of course, the thread-cutting elements and threaded portion 6 are formed in the interior of the unit and then the unit is broached from the respective ends to form the channels 4 of appropriate length.

In this connection, it is to be understood that the intermediate or sealing section 6, through which the channels 4 do not extend, may be of any appropriate length relative to the length of the unit. Thus, for example, the sealing section 6 may occupy one-third the length of the unit while the remaining two-thirds, that is one-third on each side of the section 6, provides the self-threading function. The suggestion of making the sealing section of one-third the length of the unit is merely to indicate that the function of this section is to afford a complete seal and it is to be understood that the axial length of the section 6 may be that determined for the particular coupling and its function.

In Figure 11, there is shown an enlarged view illustrating the formation of the teeth providing the thread cutters on the interior of the coupling unit. It is to be noted that these teeth have their leading edges 6' of greater inclination than their trailing edges 7 and that the ordinarily sharp apex of the tooth is slightly cut away to leave a flattened end 8. This increased inclination of the leading edge of the thread cutter tends to a more easy application of the self-cutting function of the coupling unit in that the diagonal cut is more easily performed than would be the line of cut more closely approaching the vertical. Furthermore, with the trailing edges of each thread cutter at a less inclination than the leading edge, there is a tendency to a more complete wedging action of the formed threads on the conduit with those on the unit than would be the case if the leading and trailing edges were at the same inclination. Of course, the sealing section 6, which is of uninterrupted thread formation, provides the same type of thread as that described.

As an alternative form to the integral sealing section 6 of the unit, the invention contemplates the use of an auxiliary member 9 in the form of an annular ring or washer 10 having exterior projections 11 corresponding in number to those of the channels 4 in the unit, with portions 12 intermediate the projections to just overlie the surface of the thread cutters of the unit. This sealing element 9 is slightly over-size with respect to the unit and is forced under pressure lengthwise the unit to a point approximately centrally of its length. The projections 11 completely seal the channels 4 within the area occupied by the element and as the ends of the conduit sections abut the edges of the element 9, it is impossible for seepage to enter the ends of the conduit sections because the only passage for such seepage is through the broached channels 4 and these are as completely closed in the use of the independent sealing element as they are in connection with the integral sealing section 6.

Where the unit is designed for coupling copper tubing or pipes for the passage of fluid, it is preferred that the independent sealing element 9 be used in connection with the unit 1 and that the end edges of the element 9 be inwardly flared, as indicated at 13 in Figures 4 and 6. As the unit is coupled to the tubing or pipe, the ends of such tubing or pipe are outwardly flared by the inturned ends of the element 9 and there is thus a more effective sealing of the ends of the tubing or pipe while providing unrestricted passage of the fluid through the element 9. This particular arrangement is shown in Figure 4 from which it will be noted that, following the introduction of the element 9, the broached channels 4 are sealed throughout the axial length of that element and, therefore, it is impossible, particularly where the ends of the tubing or pipe pass beyond the seal broaches through the flared ends of the element, for any of the flowing fluid to escape.

While the independent element 9, as used in connection with electrical conduits, has not been described as having the flared ends 13, it is understood that the flared ends may be provided on the sealing element 9 even when used with electrical conduits, if found necessary.

The invention lends itself also with particular advantage to the thimbles usually employed for connecting the ends of electrical conduits to junction boxes. Such thimbles are illustrated more particularly in Figures 8, 9 and 10. As shown, they comprise the conventional body 14, having an angular head 15 for wrench application and an exteriorly threaded wall 16 to receive a nut 17 for connecting the thimble to the junction box. The thimble is provided with interior thread-cutting elements 18 exactly as in the unit 1, the entrant end for the conduit being practically plain at 19 to provide for the entrance of the conduit, and the immediately adjacent threads being very fine and of reduced height and gradually increased to the proper threading depth, as is necessary for the self-threading operation.

When the thimble is used with an electrical conduit, the thimble, when applied to the conduit and turned by a wrench, will cut the necessary threads on the conduit to insure a substantial union between the thimble and conduit, preventing relative endwise movement of the thimble and yet facilitating its removal when necessary for repair or other purposes. Ordinarily, the section of conduit to which the thimble is to be applied is more or less rough with sharp edges at the end to which the thimble is applied incident to cutting the end of the conduit by a hack-saw or the like to obtain the proper length. If there is no limit to the application of the thimble, it may happen that the thimble will be threaded so far onto the conduit that the roughened and sharp end of the conduit will project beyond the trailing edge of the thimble. As the wires extend through the conduit and beyond the same for connection in the junction box, the presence of any roughened or sharp portions with which the wires may come in contact will have a tendency to cut through the insulation of the wires because of short or other difficulty requiring repair.

In order to avoid this possibility, the end of the threaded wall 16 of the thimble is thickened to provide interiorly of the thimble, at the end passed through the opening in the junction box, an abrupt shoulder 20 and the free face of the thickened portion of the thimble wall is rounded, as at 21. Obviously, the thimble is limited in its application to the conduit because the end of the conduit will eventually reach and contact the shoulders 20 when further threading movement of the thimble is prevented. Thus, the ends of the conduit can never project beyond that end of the thimble through which the wires extend in completing the connection. Therefore, the wires cannot possibly be affected by any roughened or sharp end of the conduit and such wires are further protected by the rounded surface 21 of the thimble proper.

The thread-cutting elements 18 in the thimble are separated by the usual channel 22 similar to that employed in the coupling and the thread-cutting elements 18 are formed similar to that described in connection with the illustration of Figure 11.

In applying the coupling for the meeting ends of sections of electrical conduit 5, one end of the coupling is first placed on the end of one section and turned by the application of a wrench, forming threads on the conduit and advancing lengthwise the conduit. This is a self-threading operation and incident to the particular formation of the thread-cutting elements 3, as previously described, the operation of the self-threading movement requires materially less power than would an ordinary thread-cutting function. Furthermore, the apexes of the thread-cutting elements are slightly flattened and thus there is little liability of these thread-cutting elements cutting through the thickness of the conduit.

After the application of the unit to one conduit section, the adjacent conduit section is threaded into the unit, the self-threading operation is, of course, identical with that previously described, and the threading operation of the unit on the one section of conduit and the threading operation on the other section of the conduit into the unit are continued until the ends of the units abut, both having threaded connection with the sealing section 6, where the integral sealing section is employed, or the threading operation described is continued until the ends of the conduit meet either the straight or flared ends of the removable sealing element 9, if the latter is employed. Under both circumstances, the broached channels 4 are sealed beyond or substantially at the meeting ends of the conduit or the meeting ends of the conduit and removable sealing element 9. Exterior water or moisture is, therefore, prohibited from entering the conduit and one of the serious disadvantages of employing couplings as heretofore constructed is entirely avoided in this manner.

Where the unit is employed for connecting copper tubing or pipes for conveying fluid, the application of the unit is as previously described. In this use, however, the coupling is preferably provided with the removable sealing element 9, having its end edges flared as described. As the connection is made, the ends of the tubing or pipes to be united are outwardly flared by the inwardly flared ends of the element 9 and as this element 9 seals the broached channels 4, at least throughout the axial length of the element, leakage from the connection is impossible.

In the use of the thimble, the latter is threaded on the end of the electrical conduit, forming its own threads and providing an inseparable connection except through a threading movement. The application of the thimble is continued until the ends of the conduit bear against the shoulders 20 and the thimble and connected end of the conduit are thus passed through the end of the junction box and secured by the application of the nut 17.

It is to be particularly emphasized that the coupling unit and thimble are designed for use with electrical conduits and copper tubing or pipe, the walls of which are necessarily, as commercially produced, very much thinner than are the walls of conventional pipe. The coupling and thimble are formed with connecting elements particularly designed to form a proper gripping thread on the parts to be connected without requiring the application of sufficient power which of itself might tend to crush or rupture the conduit or copper tubing or pipe. Therefore, the thread cutters have the particular formation described and indicated in Figure 11. By the flattened apexes of the thread cutters, a practically full thread-cutting operation is secured without the liability of the otherwise sharpened edge cutting through the conduit or tubing or pipe.

Furthermore, the coupling unit is particularly designed with a view to preventing seepage into the union, where the coupling is used with electrical conduits, or escape of the carried fluid, where the union is used with copper tubing or pipe. This is effectively secured by the integral sealing section 6 or by the use of the independent sealing element 9, as previously described. The material employed in the coupling unit and in the thimble must, of course, be such as to permit effective handling and application, and the thread-cutting portions of such unit and thimble must, of course, be so hardened as to effectively cut the desired threads in the parts with which they cooperate. Otherwise, and except as above specifically described, no limitation is intended in any particular by any showing of specific relation or sizes of parts or suggestions as to material employed.

What is claimed to be new is:

1. A self-threading coupling unit interiorly formed with thread cutter sections and intervening channels, and means on the interior of the unit for sealing the channels throughout a portion of their lengths, the sealing means comprising an independent element formed with projections to seat with a driving fit in the channels of the unit and having an axial length materially less than that of the unit.

2. A self-threading coupling unit interiorly formed with thread cutter sections and intervening channels, and means on the interior of the unit for sealing the channels throughout a portion of their lengths, the sealing means comprising an independent element formed with projections to seat with a driving fit in the channels of the unit and having an axial length materially less than that of the unit, the end edges of the element being inwardly flared.

3. A self-threading coupling unit interiorly formed with thread cutter sections and intervening channels, and means on the interior of the unit for sealing the channels throughout a portion of their lengths, the sealing means comprising an independent element formed with projections to seat with a driving fit in the channels of the unit and having an axial length materially less than that of the unit, the exterior surface of the element overlying the thread cutter sections and having an interior diameter corresponding to that of the tubular elements to be connected.

JAMES N. ICE.